UNITED STATES PATENT OFFICE.

JOHN C. MOTT, OF NEW YORK, N. Y.

METHOD OF PRESERVING CIDER.

SPECIFICATION forming part of Letters Patent No. 365,148, dated June 21, 1887.

Application filed March 18, 1886. Serial No. 195,747. (No specimens.)

*To all whom it may concern:*

Be it known that I, JOHN C. MOTT, of the city, county, and State of New York, have invented certain new and useful Improvements in the Method of Preserving Cider, &c., of which the following is a specification.

This invention relates to an improved method of preserving fermented and unfermented cider, wine, and other fruit-juices, so that they can be kept any length of time without deterioration and without forming sediment; and the invention consists of a method of preserving wine, cider, and other fruit-juices by filtering the same, then impregnating the juices with carbonic-acid gas, inclosing them in bottles, and, lastly, steaming or pasteurizing said carbonated juices.

In carrying out my invention, I take the fermented or unfermented juice of fruits—such as wine, cider, &c.—and clarify the same by filtering through any approved reliable filter. I then impregnate said juices with carbonic-acid gas and fill the same into hermetically-sealed bottles. The bottles and their contents are then exposed to the so-called "steaming" or "pasteurizing" process, by which the juices are preserved for any length of time in a perfectly-clear state, while on opening the bottles the juice is dispensed in a sparkling state.

I am aware that the steps which I employ for preserving fruit-juices are not new in themselves, as filtering, carbonating, and steaming have been used in making beverages; but I do not know that before my invention a method combining the three different steps of filtering, carbonating, and steaming cider and other fruit-juices has ever been known.

I am aware that fruit-juices have been preserved heretofore by subjecting them to the boiling temperature after they have been pressed, and afterward, when the juices have been allowed to cool, carbonating them into closed vessels. In my process, however, the juices are first filtered, then carbonated, and, finally, steamed while in the bottles, whereby a perfectly clear champagne-like beverage is obtained.

Having thus described my invention, I claim as new and desire to secure by Letters Patent—

The method herein described of preserving cider and other fruit-juices, which consists, first, in filtering said juices; secondly, carbonating said juices and placing them in closed vessels, and, thirdly, steaming or pasteurizing said juices while in said bottles, substantially as set forth.

In testimony that I claim the foregoing as my invention I have signed my name in presence of two subscribing witnesses.

JOHN C. MOTT.

Witnesses:
PAUL GOEPEL,
MARTIN PETRY.